3,069,453
METHOD OF PRODUCING A PRODUCT HAVING A BASE OF PHOSPHORIC ACID ESTERS SUITABLE FOR USE AS A PEST CONTROL AGENT

Horst Peissker, Berlin-Charlottenburg, and Albert Jäger, Berlin-Hermsdorf, Germany, assignors to Schering A.G., Berlin, Germany, a corporation of Germany
No Drawing. Filed July 11, 1960, Ser. No. 41,753
Claims priority, application Germany Aug. 13, 1959
8 Claims. (Cl. 260—461)

This invention relates to a method of producing a product having a base of phosphoric acid esters, suitable for use as pest control agent, and to a product thereof.

It has been found that by the reaction described below there can be prepared products having a base of phosphoric acid esters which have good insecticidal and acaricidal action.

If, for example, phosphoric acid halides of the general formula

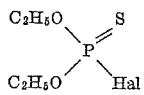

in which Hal in the molecule=halogen, are reacted in the presence of basic substances in a strongly polar solubilizer, such as dimethylformamide or diethyl formamide, at elevated temperature, there is obtained a product of the general formula $(C_2H_5O)_4P_2O_xS_y$ in which $x+y=3$, which represents a mixture of the following compounds:

It was surprising that by the said completely new reaction there are obtained compounds which have such a good action as pest control agents, since although the preparation of the pure components in other ways has already been described, this is nevertheless incomparably more difficult and inconvenient and does not give such satisfactory yields. In German Patent 953,795, it is mentioned that the difficulty of preparing this class of substances has been prevented up to now these industrially important esters from finding practical use as insecticides. As can be noted, from the examples given below, the biological activity of the pure components is also lower than that of the product in accordance with the invention. It is to be noted that the following examples of the inventor are by way of illustration and not by way of limitation or restriction.

EXAMPLE 1

25 ml. of dimethyl formamide (hereinafter called DMF) and 18.85 grams (0.1 mol) of O,O-diethylthionophosphoric acid chloride are heated in 50 ml. of chloroform with the addition of 8.4 grams (0.1 mol) sodium bicarbonate for two hours at 100° C. with agitation and under reflux. This reactin is followed by cooling and the removal of the precipitated sodium chloride by suction filtration, whereupon the residue is then washed with chloroform. The chloroform solution is washed with a saturated sodium bicarbonate solution and thereupon with water, dried over sodium sulfate and evaporated in vacuum. 17.1 grams of an oil remain.

EXAMPLE 2

377 grams (2 mol) of O,O-diethylthionophosphoric acid chloride are dissolved in 1000 mls. of chloroform and 500 mls. of DMF are added. After 5 minutes, permitting reatcion to take place, 168 grams (2 mols) of sodium bicarbonate are added with agitation and the mixture is heated on an oil bath for 2 hours at 100° C., with agitation. Thereupon the reaction solution gives a neutral reaction. It is cooled off, washed with 500 mls. of water, thereupon with 500 mls. of 5 percent caustic soda solution and again with 500 mls. of water. After separation of the wash water and drying the chloroform solution over sodium sulfate, the solvent is removed in a vacuum, there being obtained after distillation in vacuo 140 grams of pure product which has the excellent insecticidal action described below.

It is to be noted that the crude mixture can also be used directly, without distillation, for combating insects, in which case there are obtained 304 grams of crude product which has a higher effectiveness than diazinone.

As basic agents there can be used, in addition to the sodium bicarbonate described above, other substances known to have the same action, such as sodium carbonate, potassium carbonate, sodium hydroxide, potassium hydroxide, lithium hydroxide, etc. Instead of chloroform, there can also be used other customary inert solvents, such as halogenated hydrocarbons, aromatic hydrocarbons, cyclohexane, etc.

Analysis of the mixture prepared in accordance with Example 2 gave the following values: C 31.4%, H 6.5%, P 19.94%, S 13.4%, Ethoxyl 57.2%.

A mixture of 30 percent of the compound A

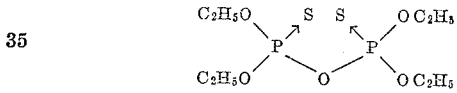

and 70 percent of the compound B

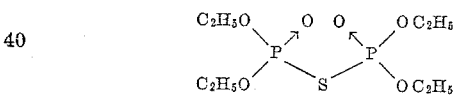

gives the following calculated values: C 30.94%, H 6.43%, P 19.98%, S 12.98%, Ethoxyl 57.3%. As can be concluded on basis of gas chromatograms, the product of the invention is accordingly a mixture of the said components in a ratio of about 3 to 7.

Biological Tests

From the following tests, the wide activity spectrum of the product claimed can be noted, as well as its superiority over known commercial products, such as O,O-diethyl - O - (2 - isopropyl - 4 - methyl-pyrimidyl-6) thionophosphoric acid ester (diazinone) and the pure component tetraethyl dithionopyrophosphate (Sulfo-TEPP), of the agents in accordance with Example 1 product (A) and the pure product (B), prepared in accordance with Example 2. For the preparation of the aqueous emulsions, one started from emulsion concentrates containing 25 percent active material which were formulated with 65 percent aromatic hydrocarbons, for instance benzol, xylol or toluol and 10 percent emulsifier on basis of an alkyl-aryl-polyetheralcohol (emulgator IV D, manufacturer, Farbwerke Hoechst, Germany).

(a) *House flies* (Musca domestica L.).—In the standard fly test, after the application of different concentrated aqueous active-material emulsions, the effect of the dry spray coating on 4-day-old flies was tested.

| Compound | Active material density of covering in $\gamma/cm.^2$ | 50 percent mortality after — minutes |
|---|---|---|
| Product A | 4<br>2<br>1 | 4<br>5<br>10 |
| O,O-diethyl-O(2-isopropyl-4 methyl-pyrimidyl-6)thiophosphoric acid ester. | 4<br>2<br>1 | 14<br>17<br>22 |
| Product B | 0.4<br>0.2 | 23<br>55 |
| Sulfo-TEPP | 0.4<br>0.2 | 38<br>62 |

(b) *Grain weevil* (Calandra granaria L.).—In the Petri-dish test, the action of the dry spray coating on grain weevils was tested after application of aqueous active-material emulsions of different concentration. The efficiency, expressed as percentage of the dead and injured experimental animals found in definite back position was determined after 20 hours exposure in closed vessels.

| Compound | Density of covering in $\gamma/cm.^2$ | Efficiency in percent after 2 days |
|---|---|---|
| Product A | 4<br>2<br>1 | 100<br>100<br>100 |
| O,O-diethyl-O(2-isopropyl-4-methylpyrimidyl-6)thiophosphoric acid ester. | 4<br>2<br>1 | 100<br>98<br>49 |
| Product B | 1<br>0.5 | 100<br>83 |
| Sulfo-TEPP | 1<br>0.5 | 70<br>63 |

(c) *Stick insects* (Dixippus morosus) (Brunner).—In order to test the contact action, stick insects (4th stage of development) were dipped in aqueous active-material emulsions and after brief drying off on filter paper placed on untreated fodder corps (Tradescantia).

| Compound | Concentrate of active material in percent | Mortality in percent after— | |
|---|---|---|---|
| | | 1 day | 2 days |
| Product A | 0.05 | 96 | 100 |

(d) *Gypsy moth* (Lymantria dispar L.).—In order to test for contact and stomach action, different concentrated aqueous active-material emulsions were applied to caterpillars IV and fodder plants (Quercus ilex). The caterpillars after the drying on of the spray coating were placed on the fodder plants.

| Compound | Concentration in percent | Mortality in percent after 2 days |
|---|---|---|
| Product A | 0.05<br>0.02 | 100<br>93 |

(e) *American cockroach* (Periplaneta americana L.).—In the standardized dish test after application of different concentrated active-material emulsions, the action of the dry spray coating on adults and larvae of Periplaneta americana (cockroaches) was tested.

| Compound | Dose in mg. of active material/dm.$^2$ | Mortality in percent after 24 hours |
|---|---|---|
| Product A | 0.05<br>0.1 | 70<br>100 |
| Product B | 0.05<br>0.1 | 85<br>100 |
| Sulfo-TEPP | 0.05<br>0.1 | 40<br>85 |

(f) *Aphids* (Aphis fabae L.).—Beans (Vicia faba) infested with aphids were treated with different concentrated aqueous active-material emulsions.

| Compound | Concentration of active material in | Mortality in percent after 24 hours |
|---|---|---|
| Product A | 0.01<br>0.005 | 100<br>100 |

(g) *Spider mites* (Tetranychus urticae KOCH).—In order to test the acaricidal action, potted beans (Phaseolus vulgaris) infested with spider mites were treated with aqueous emulsions containing 0.005% of active material.

| Compound | Action in percent on— | | | |
|---|---|---|---|---|
| | Adults | Nymphs | Larvae | Eggs |
| Product A | 87 | 93 | 100 | 25 |
| Product B | 100 | 100 | 100 | 37 |

(h) *Phyllodromia germanica L.*—With the same experimental set-up as under e. glass vessels were each charged with 10 experimental animals (Imagines).

| Compound | Dose in mg. active material per dm.$^2$ | Efficiency in percent after— | | |
|---|---|---|---|---|
| | | 1 hour | 2 hours | 3 hours |
| Product B | 0.125<br>0.025 | 50<br>20 | 70<br>50 | 100<br>70 |
| Sulfo-TEPP | 0.125<br>0.025 | 0<br>0 | 40<br>0 | 90<br>30 |

From the foregoing it will be noted that there are provided according to the present invention, a method and product for killing insects and other pests of such nature.

We claim:

1. Method of producing a product having an insecticidal and acaricidal effect which comprises reacting an O,O-diethylthionophosphoric acid halide with a diloweralkyl formamide and with an inorganic base at elevated temperature.

2. A method of producing an insecticide comprising reacting a phosphoric acid halide, having the formula $(C_2H_5O)_2P(S)$-Hal wherein Hal is halogen, with a diloweralkyl formamide at an elevated temperature to obtain a product having the formula $(C_2H_5O)_4P_2O_xS_y$ in which $x$ and $y$ are each at least one, and $x+y=3$.

3. The method according to claim 1 in which the dialkyl formamide is diloweralkyl formamide.

4. A method of producing a pest control agent comprising reacting a compound having the formula $$(C_2H_5O)_2P(S)\text{-Hal}$$

wherein Hal is halogen with a diloweralkyl formamide at an elevated temperature, adding an inorganic base, washing, collecting and drying the resulting product.

5. A method of producing a pest control agent comprising reacting an O,O-diethylthionophosphoric acid halide in a chloroform solution with an alkali and a diloweralkyl formamide heating to about 100° C., agitating and refluxing, cooling the reaction mixture, removing the resulting alkali metal chloride, washing the residue with a solvent, then washing with water and evaporating in vacuo.

6. A method of preparing a substance of the formula $(C_2H_5O)_4P_2S_xO_y$, wherein $x$ and $y$ are each at least one, and $x+y=3$, which comprises reacting an O,O-diethyl thionophosphoric acid halide in an inert substantially anhydrous liquid medium with a dilower alkyl formamide and an alkali at an elevated temperature.

7. A method according to claim 6, wherein said alkali is an alkali metal compound selected from the group consisting of the hydroxides, carbonates, and bicarbonates.

8. A method according to claim 6, wherein said elevated temperature is approximately 100° C.

References Cited in the file of this patent

UNITED STATES PATENTS

| | | |
|---|---|---|
| 2,198,915 | MacAfee | Apr. 30, 1940 |
| 2,479,939 | Kosolapoff | Aug. 23, 1949 |
| 2,567,154 | Kosolapoff | Sept. 4, 1951 |
| 2,663,722 | Toy | Dec. 22, 1953 |